United States Patent [19]

Bos

[11] Patent Number: 4,900,132
[45] Date of Patent: Feb. 13, 1990

[54] CHIRAL LIQUID CRYSTAL CELL

[75] Inventor: Philip J. Bos, Portland, Oreg.

[73] Assignee: Tektronix, Inc., Beaverton, Oreg.

[21] Appl. No.: 236,335

[22] Filed: Aug. 19, 1988

Related U.S. Application Data

[63] Continuation of Ser. No. 38,567, Apr. 13, 1987, abandoned.

[51] Int. Cl.⁴ .............................................. G02F 1/13
[52] U.S. Cl. ................................. 350/346; 350/350 S
[58] Field of Search ...................... 350/346, 350 S, 351

[56] References Cited

U.S. PATENT DOCUMENTS

| | | | |
|---|---|---|---|
| 4,333,708 | 6/1982 | Boyd et al. | 350/346 |
| 4,566,758 | 1/1986 | Bos | 350/346 |
| 4,582,396 | 4/1985 | Bos et al. | 350/346 |
| 4,589,735 | 5/1986 | Saunders | 350/346 |

FOREIGN PATENT DOCUMENTS

| | | | |
|---|---|---|---|
| 3502160 | 7/1985 | Fed. Rep. of Germany | 350/350 S |
| 0220316 | 11/1985 | Japan | 350/346 |
| 2153129 | 8/1985 | United Kingdom | 350/346 |

OTHER PUBLICATIONS

N. A. Clark and S. T. Lagerwall, "Structures and Applications of SSFLC Devices," *Japan Display* '86, Sep. 30–Oct. 2, 1986, 456–458.

N. A. Clark and T. P. Rieker, "The Smectic C 'Chevron ∞, A Planar Liquid Crystal Defect: Implications for the Surface Stabilized Ferroelectric Liquid Crystal (SSFLC) Geometry," presented in Arcachon, France, Sep. 1987.

Clark et al., "Submicrosecond Bistable Electro-Optic Switching in Liquid Crystals", *Applied Physics Letters*, 36 (1), 899–901, 1 Jun. 1980.

Patel et al., "A Reliable Method of Alignment for Smectic Liquid Crystals", *Ferroelectrics*, vol. 59, pp. 137–1445, 1984.

Uemura et al., "Alignment of Chiral Smectic C Liquid Crystal by Oblique Evaporation [sic] Method", *Japan Display* '86, pp. 464–467.

*Primary Examiner*—Stanley D. Miller
*Assistant Examiner*—Huy Kim Mai
*Attorney, Agent, or Firm*—John D. Winkelman; Paul S. Angello

[57] ABSTRACT

A liquid crystal cell (10) includes a chiral liquid crystal material (16) captured between a pair of electrode structures (12 and 14). The liquid crystal material is of a type that exhibits in consecutive order chiral semitic nematic, smectic A, and chiral phases at successively lower temperatures. In a preferred embodiment, the chiral phase is of the smectic C type. The electrode structures have director alignment layers (22 and 22') deposited on their inner surfaces. The directors (28 and 30) of the liquid crystal material in the nematic phase in contact the alignment layers align at relatively large tilt bias angles relative to the alignment layer. The tilt bias angles of the directors in contact with one of the electrode structures are defined in a rotational sense which is opposite that of the tilt bias angles of the directors in contact with the other electrode structure. The liquid crystal cell of the present invention is substantially free from smectic plane alignment defects and exhibits substantially uniform director alignment properties. As a consequence, a display device (36) using the liquid crystal cell has an essentially contaminant-free viewing surface and good light extinction properties. Such a display device also has a relatively large off-axis viewing angle.

27 Claims, 4 Drawing Sheets

CHIRAL LIQUID CRYSTAL CELL

This is a continuation of application Ser. No. 038,567 filed Apr. 13, 1987 and now abandoned.

TECHNICAL FIELD

The present invention relates to liquid crystal cells used in display devices and, in particular, to a high-speed ferroelectric or chiral liquid crystal cell which is capable of providing a display device having a relatively large off-axis viewing angle.

BACKGROUND OF THE INVENTION

The basic principles underlying the structure and operation of one type of high-speed ferroelectric liquid crystal display device are described by Clark, et al., *Applied Physics Letters*, 36 (11) 1980. The display device of Clark, et al. includes a liquid crystal cell which employs a chiral smectic C liquid crystal material. A liquid crystal material of this type is characterized as having molecules that are arranged in parallel planes and tilted at acute angles relative to the normal to such planes. The molecules are rotatable about the normal to the planes and have permanent electric dipole moments that are perpendicular to the longitudinal axes of the molecules.

The liquid crystal cell of Clark, et al. includes many smectic planes which are disposed between and perpendicular to an opposed pair of parallel transparent electrode plates. Potential differences applied between the electrode plates generate in the region of the liquid crystal material electric fields that are directed toward one of the two plates. The electric fields couple with the dipole moments of the liquid crystal molecules such that the molecules assume one of at least two orientations that depend upon the directions of the electric fields. When such a liquid crystal cell is placed between a pair of neutral density linear polarizers whose transmission axes are orthogonally aligned, the molecular orientations are optically distinguishable, thereby forming a ferroelectric liquid crystal display device having a light transmitting state and an opaque state.

The liquid crystal cell of Clark, et al. employs a liquid crystal material that exhibits in consecutive order the isotropic, smectic A, and smectic C phases at successively lower temperatures. Such a liquid crystal material in the isotropic phase is introduced between the pair of electrode plates and then cooled until it enters the smectic A phase. The planar arrangement of the liquid crystal molecules is obtained by repeatedly shearing the electrode plates relative to each other until the smectic planes are formed. The liquid crystal molecules contacting the electrode structures lie substantially parallel to them. The device is then cooled to the smectic C phase. A principle problem of the shearing method of alignment is the difficulty associated with the manufacturability of a device of this type.

Another method of aligning the smectic planes entails the use of a rubbed polymer alignment layer such as that described by Patel, "A Reliable Method of Alignment for Smectic Liquid Crystals" *Ferroelectrics*, Vol 59, p. 137, 1984. The problem with a liquid crystal cell of this type is that it often exhibits smectic plane alignment defects after the cell has been switched between the light transmission and opaque states. The smectic plane alignment defects appear as zig-zag patterns on the surface of the liquid crystal cell.

Smectic C liquid crystal cells purportedly having relatively few smectic plane alignment defects are described by Uemura, et al., *Alignment of Chiral Smectic C Liquid Crystal by Oblique Evapolation* [sic] *Method*, Japan Display '86, 464–467. Uemura, et al. employ a liquid crystal material that exhibits in consecutive order the isotropic, nematic, smectic A, and smectic C phases at successively lower temperatures. Such a liquid crystal material in the isotropic phase is positioned between a pair of opposed electrode plates which have been treated so that the directors of the liquid crystal material in contact with the electrode plates lie at pretilt angles of between 20° and 25°, the pretilt angles of the directors in contact with the two electrode plates being defined in the same rotational sense. Such a director configuration is sometimes called "anti-parallel alignment." The liquid crystal cell is then cooled so that the liquid crystal material successively enters the nematic, smectic A, and smectic C phases. Although the liquid crystal cells of Uemura, et al. are purportedly relatively free from smectic plane alignment defects, display devices incorporating such cells typically have undesirably narrow viewing angles.

The inventor of the liquid crystal cell described herein has experienced difficulty in obtaining uniform director alignment in large area liquid crystal cells employing anti-parallel director alignment. Display devices using such large area cells suffer from light leakage at various locations on the viewing surface because the nonuniform director alignment makes it impossible to align the polarization axes to achieve complete extinction.

SUMMARY OF THE INVENTION

An object of this invention is, therefore, to provide a high-speed chiral liquid crystal cell that is capable of providing a display device having a relatively large off-axis viewing angle.

Another object of this invention is to provide such a liquid crystal cell that is substantially free from smectic plane alignment defects.

A further object of this invention is to provide such a liquid crystal cell which has a large surface area and whose directors are uniformly aligned to provide a display device having a large viewing area and good light extinction properties.

The present invention is directed to a liquid crystal cell that includes a pair of spaced-apart, opposed electrode structures having a chiral liquid crystal material captured between them. The liquid crystal material is of a type that exhibits in consecutive order isotropic, chiral nematic, smectic A, and chiral smectic phases at successively lower temperatures. Each of the electrode structures has an inner surface with a director alignment layer deposited on it. The directors are an axis specifying the local average molecular orientation. The director alignment layer of each electrode structure is conditioned so that the directors of the liquid crystal material in contact therewith align at relatively large acute tilt bias angles relative to the director alignment layer. The electrode structures are oriented so that the tilt bias angles of the directors in contact with one of the electrode structures are defined in a rotational sense which is opposite that of the tilt bias angles of the directors in contact with the other electrode structure. Such a liquid crystal cell is substantially free from smectic plane alignment defects and exhibits substantially uniform director alignment properties.

Positioning the liquid crystal cell between a pair of polarizing filters provides a display device which has a relatively wide field of view and which is substantially free from viewing surface defects. The liquid crystal cell typically functions as a bistable device having two optical states that are characterized by different orientations of the optic axis which is determined by the orientation of the directors. The orientation of the optic axis changes in response to the direction of an electric field produced by an excitation voltage applied to the cell electrode structures. The optic axis preferably changes its orientation by 45° to provide a display device that switches optimally between a light transmitting state and an opaque state.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
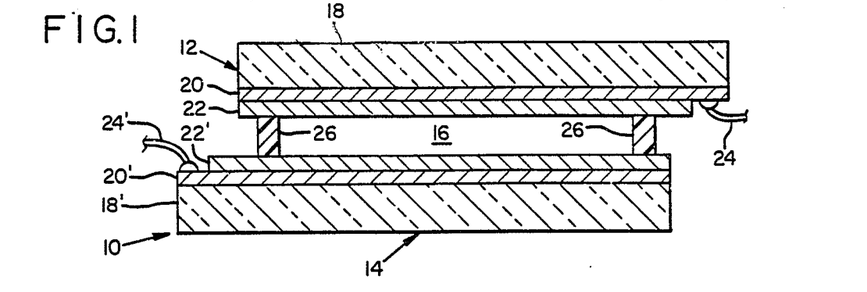
FIG. 1 is a diagrammatic cross-sectional side view of the liquid crystal cell of the present invention.

With reference to FIG. 1, a chiral liquid crystal cell 10 of the present invention comprises a pair of generally parallel, spaced-apart electrode structures 12 and 14 with a chiral liquid crystal material 16 captured between them. Liquid crystal material 16 is of a type which exhibits each of the isotropic, chiral nematic, smectic A, and chiral smectic C phases. One such type of liquid crystal material can be, for example, liquid crystal compound number 3041 manufactured by E. Merck of Darmstadt, West Germany. This particular liquid crystal material is a mixture containing phenylpyrimidine liquid crystal materials and is especially desirable because it exhibits the chiral smectic C phase at about room temperature. This material provides, however, a cone angle (i.e., the angle a director makes relative to the normal to the smectic plane) of 15°, which is less than the desired 22.5° angle. A cone angle of 22.5° would provide the desired 45° shift in the orientation of the optic axis which provides a display device that has maximum brightness in the light transmitting state. The 15° cone angle provides, therefore, a display device of suboptimal brightness.

Electrode structure 12 includes a glass dielectric substrate 18 which has on its inner surface a layer 20 of electrically conductive but optically transparent material such as, for example, indium tin oxide A director alignment film layer 22 is applied to conductive layer 20 and forms a boundary between electrode structure 12 and liquid crystal material 16. The alignment film surface that contacts the liquid crystal material is conditioned to promote a preferred orientation of the directors of the liquid crystal material in contact with it, as described in greater detail hereinbelow. Electrode structure 14 is of similar construction to that of electrode structure 12, and the components of electrode structure 14 corresponding to those of electrode structure 12 are shown with identical reference numerals followed by primes.

Electrode structures 12 and 14 are offset relative to each other to provide access to conductive layers 20 and 20' for connecting to terminals 24 and 24' the output conductors of a drive circuit 25 (FIG. 4) for the liquid crystal cell. Spacers 26 separate and preserve the generally parallel relation between electrode structures 12 and 14. Spacers 26 comprise any suitable material such as, for example, glass fiber.

Drive circuit 25 selectively applies one of two potential differences of opposite polarity between conductive layers 20 and 20' to generate in the region of liquid crystal material 16 an electric fields that is directed toward one of the two conductive layers. The polarity of the potential difference determines to which one of the conductive layers the electric field is directed. The electric field introduced within the cell couples with the dipole moments of the liquid crystal directors such that they assume one of two orientations that depend upon the direction 27 (FIG. 2) of the electric field last generated between conductive layers 20 and 20'.

The presence of an electric field within the cell for about 100 microseconds commands the directors into one of the two orientations. Liquid crystal cell 10 is of the bistable type because the directors remain in that orientation in the absence of an electric field. As a consequence, director molecules assuming a particular orientation in response to an electric field directed toward conductive layer 20 tend to remain in that orientation until an electric field directed toward conductive layer 20' drives them into the other orientation.

Figure 2:
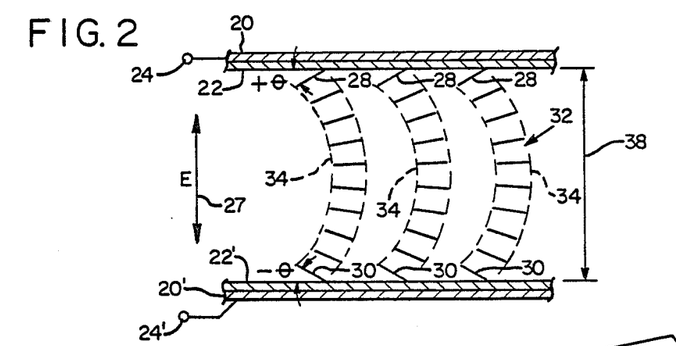
FIG. 2 is a schematic diagram of what is believed to be the director alignment configuration of the liquid crystal material employed in the liquid crystal cell of the present invention.

FIG. 2 shows what is believed to be the alignment configurations of the directors of smectic C liquid crystal material 16 disposed within liquid crystal cell 10. Alignment film layer 22 of electrode structure 12 is conditioned so that in the nematic phase the directors 28 in contact with film layer 22 are aligned generally parallel to each other at an acute tilt bias angle $+\theta$, which is measured in the counterclockwise sense with reference to the surface of film layer 22. Alignment film layer 22' of electrode structure 14 is conditioned so that in the nematic phase the directors 30 in contact with film layer 22' are aligned generally parallel to each other at an acute tilt bias angle $-\theta$, which is measured in the clockwise sense with reference to the surface of film layer 22'. Liquid crystal cell 10 is fabricated, therefore, so that the surface contacting directors 28 and 30 on the respective director alignment layers 22 and 22' have tilt bias angles which are defined in opposite directions of rotation. Experimental evidence suggests that the different orientations of the surface contacting directors 28 and 30 result in the arrangement of surface noncontacting directors 32 of smectic C liquid crystal 16 in generally parallel curved smectic layers 34.

Figure 3:
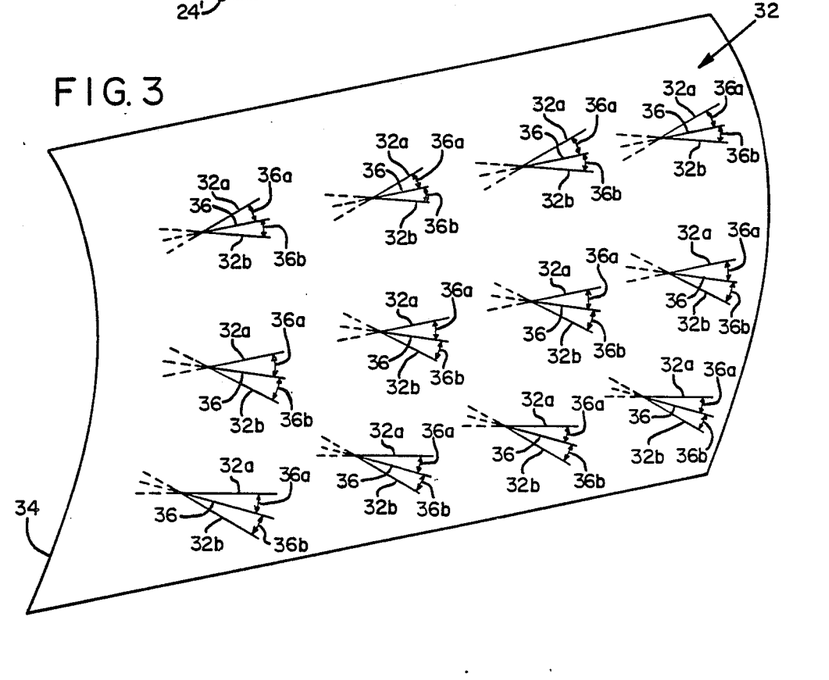
FIG. 3 is an isometric view showing the tilt of the surface noncontacting directors relative to the normal to one of the curved smectic layers of FIG. 2.

Since liquid crystal material 16 is in the smectic C phase, the directors of liquid crystal material 16 are also tilted relative to axes orthogonal to smectic layers 34. FIG. 3 is an isometric view showing the tilt of the surface noncontacting directors 32 relative to the normal 36 to one of the curved-smectic layers 34 of FIG. 2. Directors 32 form an angle 36a of about 15° of positive rotational sense relative to normal 36 into the plane of FIGS. 2 and 3. Although liquid crystal material 16 is of the chiral type, liquid crystal cell is sufficiently thin (i.e., the distance 38 between film layers 22 and 22' is sufficiently small) so that directors 32 do not define an appreciable twist configuration along the thickness of the cell. Liquid crystal cell 10 is about 2 microns in thickness, which imparts half-wave retardation of green light.

The absolute values of tilt bias angles $+\theta$ and $-\theta$ are typically between about 5° and 45°, with 25°–30° being the preferred range. Tilt bias angles within these ranges provide to the liquid crystal cell directors a high pretilt alignment which improves the bistability to liquid crystal cell 10. It will be appreciated that the absolute value of tilt bias angle $+\theta$ is preferably, but not necessarily, similar to that of tilt bias angle $-\theta$.

The high pretilt alignment of surface contacting directors 28 and 30 on respective director alignment layers 22 and 22' is preferably effected by depositing in a predetermined direction silicon monoxide or another alignment material on conductive layers 20 and 20'. Methods for depositing silicon monoxide or other alignment materials to align liquid crystal directors in a predetermined direction have been disclosed previously by others and are known to those having ordinary skill in the art. One such method, for example, is disclosed in U.S. Pat. No. 4,165,923 of Janning.

Figure 4:
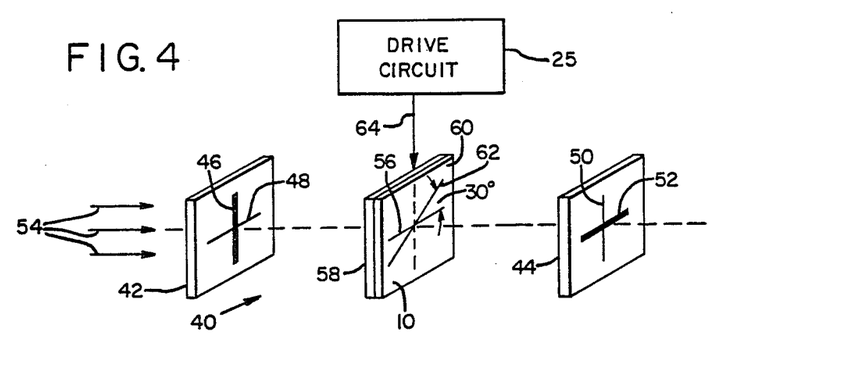
FIG. 4 is a schematic diagram of a display device that incorporates the liquid crystal cell of the present invention.

FIG. 4 is a schematic diagram of a light gate 40 that incorporates liquid crystal cell 10 to form a display device. Liquid crystal cell 10 is positioned between a pair of neutral density linear polarizing filters 42 and 44, each having orthogonally aligned polarization axes. Polarizing filter 42 has a light-absorbing vertical polarization axis 46 and a light-transmitting horizontal polarization axis 48. Polarizing filter 44 has a light-transmitting vertical polarization axis 50 and a light-absorbing horizontal axis 52. Light gate 40 receives light rays 54 emanating from a light source (not shown). Light source can be, for example, a fluorescent light.

Liquid crystal cell 10 switches between first and second optical states in response to the direction of an electric field introduced within the cell. The first and second states impart substantially half-wave retardation of normally incident light of a predetermined wavelength but change the orientation of the optic axis of liquid crystal cell 10° by 30° to provide light gate 40 with, respectively, an opaque optical transmission state and a light transmitting optical transmission state. As was stated above, the optic axis is determined by the orientation of the directors.

In the first optical state, the projection 56 of the optic axis of liquid crystal cell 10 on each of its two light-communicating surfaces 58 and 60 is disposed substantially parallel to the horizontal polarization axes 48 and 52 of respective polarizing filters 42 and 44. In the second optical state, the projection 62 of the optic axis of liquid crystal cell 10 on its two light-communicating surfaces 58 and 60 is disposed substantially at a 30° angle with respect to each one of the polarization axes of polarizing filters 42 and 44. The 30° angular difference between projections 56 and 62 in the respective first and second optical states result from the nominal 15° cone angle of the directors 32 in smectic layers 34 and the reorienting of the directors by electric fields in opposite directions. In FIG. 3, directors 32 are represented as lines 32a at an angle 36a relative to normal 36 to show one orientation of the directors and, therefore, the optic axis and as lines 32b at an angle 36b relative to normal 36 to show the other orientation of the directors and, therefore, the optic axis. The electric field introduced within liquid crystal cell 10 is developed by a potential difference that appears across the outputs 64 of drive circuit 25. Outputs 64 of drive circuit 25 are connected to terminals 24 and 24' of liquid crystal cell 10.

Whenever drive circuit 25 provides a positive voltage between terminals 24 and 24', liquid crystal cell 10 is commanded into the first optical state. Normally incident light rays 54 passing through horizontal polarization axis 48 of polarizing filter 42 propagate through liquid crystal cell 10 and are substantially absorbed by horizontal polarization axis 52 of polarizing filter 44. Essentially no light exits light gate 40 under these conditions, which develops the opaque optical transmission state.

Whenever drive circuit 25 provides a negative voltage between terminals 24 and 24', liquid crystal cell 10 is commanded into the second optical state. Normally incident light rays 54 passing through horizontal polarization axis 48 of polarizing filter 42 propagate through liquid crystal cell 10 and are transmitted through vertical polarization axis 50 of polarizing filter 44. Light exits light gate 40 under these conditions, which develops the transmitting optical transmission state.

Although the directors can be aligned along a particular direction over a microscopic area, the direction typically varies by several degrees over the surface area of the cell. The above-described liquid crystal 10 exhibits superior director alignment uniformity to that of the anti-parallel cells disclosed in the prior art. Liquid crystal 10 also exhibits superior off-axis viewing angle characteristics in that there is less intensity variation in the light transmitting state and less light leakage in the opaque state as a function of viewing angle than in display systems incorporating a liquid crystal cell with anti-parallel director alignment.

Figure 5:
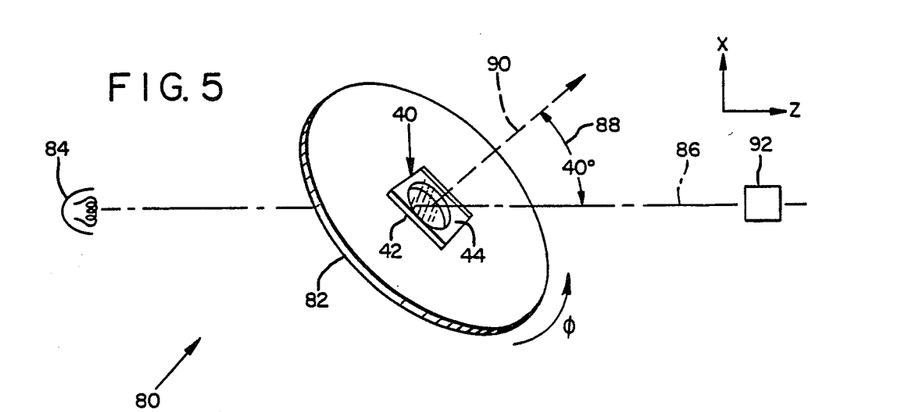
FIG. 5 shows a test apparatus for determining the viewing angle performance characteristics of the display device of FIG. 4.

FIG. 5 shows a test apparatus 80 for determining the viewing angle performance of light gate 40. Test apparatus 80 comprises a rotating table 82 which includes a transparent portion upon which light gate 40 is mounted. A source 84 of white light emits along an axis 86 parallel light rays that strike polarizing filter 42 at an angle 88 of 40° relative to the normal 90 to the surface of light gate 40. Table 82 rotates light gate 40 to determine the transmitted light intensity as a function of the azimuthal angle $\phi$ about normal 90. A light-sensitive detector 92 positioned on axis 86 receives the light transmitted by light gate 40. The figures discussed below illustrate the viewing angle performance for a liquid crystal cell of 2 micron thickness and using the E. Merck 3041 material.

Figure 6A:
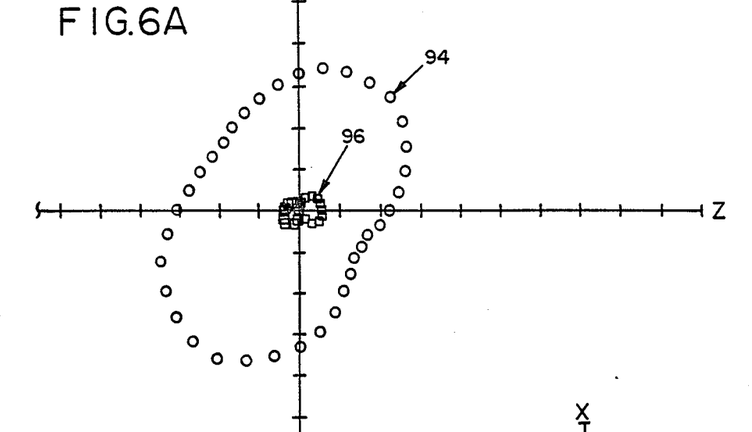
FIGS. 6A and 6B show the comparative relationship between the off-axis viewing angle performance characteristics of, respectively, the display device of FIG. 4 and a display device employing a liquid crystal cell with anti-parallel director alignment.
Figure 6B:
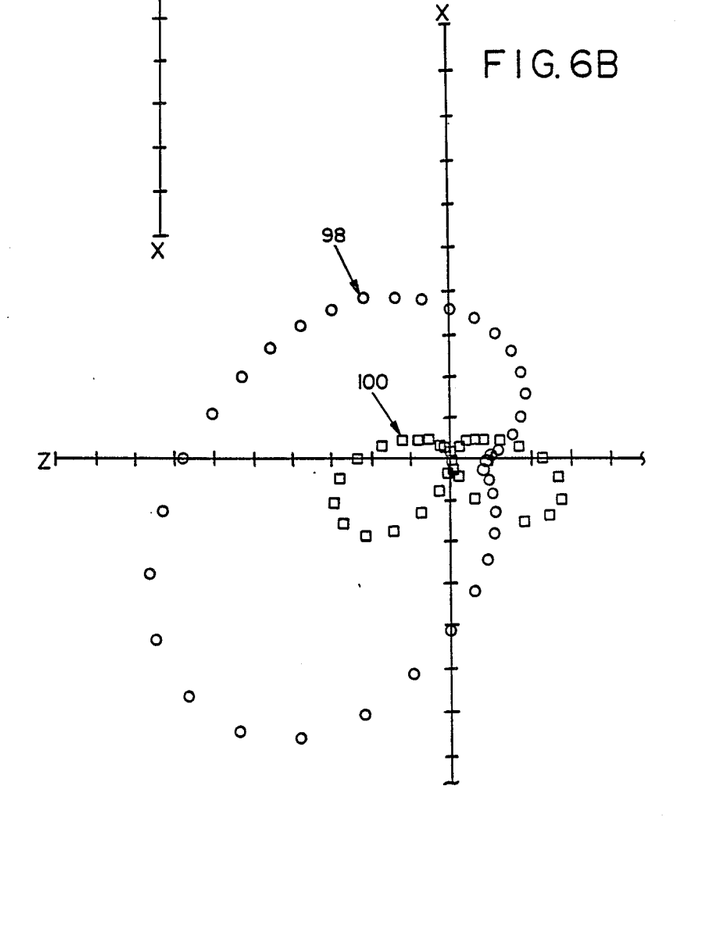

FIGS. 6A and 6B show the comparative relationship between the light intensity measured in the opaque state and the transmitting state for, respectively, the liquid crystal cell 10 of the present invention and an anti-parallel aligned liquid crystal cell of the type described by Uemura et al. The data shown in FIG. 6A were acquired for light gate 40 whose liquid crystal cell 10 was oriented with respect to polarizing filters 42 and 44 so that the on-axis light transmission was minimized in the opaque light transmission state. The data shown in FIG. 6B were acquired for a liquid crystal cell of the same retardation and tilt bias angles as liquid crystal cell 10 but with antiparallel director alignment. The liquid crystal cell was positioned between a pair of neutral density linear polarizing filters with orthogonally aligned polarization axes to form a display device.

The data for FIGS. 6A and 6B were acquired in accordance with the same procedures, which are described below with reference to FIG. 6A in the following manner. Light gate 40 was switched to its opaque state, and rotating table 82 rotated light gate 40 through azimuthal angles of 360°. The light measured by detector 92 was measured at 10° increments as a percentage of the maximum light transmission that could pass through light gate 40. Light gate 40 was then switched to its light transmitting state, and data were again acquired as was described above for the opaque state.

With reference to FIG. 6A, light intensity patterns 94 and 96 represent the intensity of light transmitted in, respectively, the transmitting state and the opaque state for liquid crystal cell 10. FIG. 6A shows that the light intensity in the opaque state is always less than that in the light transmitting state and that the variations in light intensity as a function of azimuthal angle for either state are insignificant.

With reference to FIG. 6B, light intensity patterns 98 and 100 represent the intensity of light transmitted in, respectively, the transmitting state and the opaque state for a liquid crystal cell having anti-parallel director alignment. FIG. 6B shows that there exist azimuthal angles for which the intensity of light transmitted in the opaque state is greater than that transmitted in the light transmitting state and that the variations in light intensity as a function of azimuthal angle for both states are significant. FIG. 6B indicates that a viewer of a device employing a liquid crystal cell having antiparallel director alignment and presenting an image comprising dark and light pixels would notice a change in appearance of the image as the viewer varied the angle from which he viewed the display.

Figure 7A:
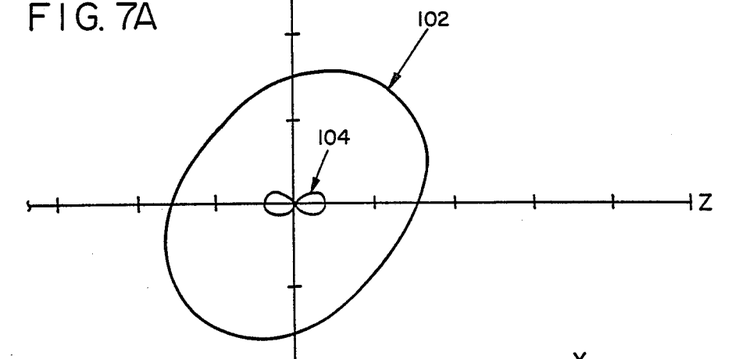
FIGS. 7A and 7B show the comparative relationship between the computed off-axis viewing angle performance characteristics of a display device employing a liquid crystal cell having, respectively, curved smectic layers with director tilt bias angles of 30° and straight smectic layers with director tilt bias angles of 30°.
Figure 7B:
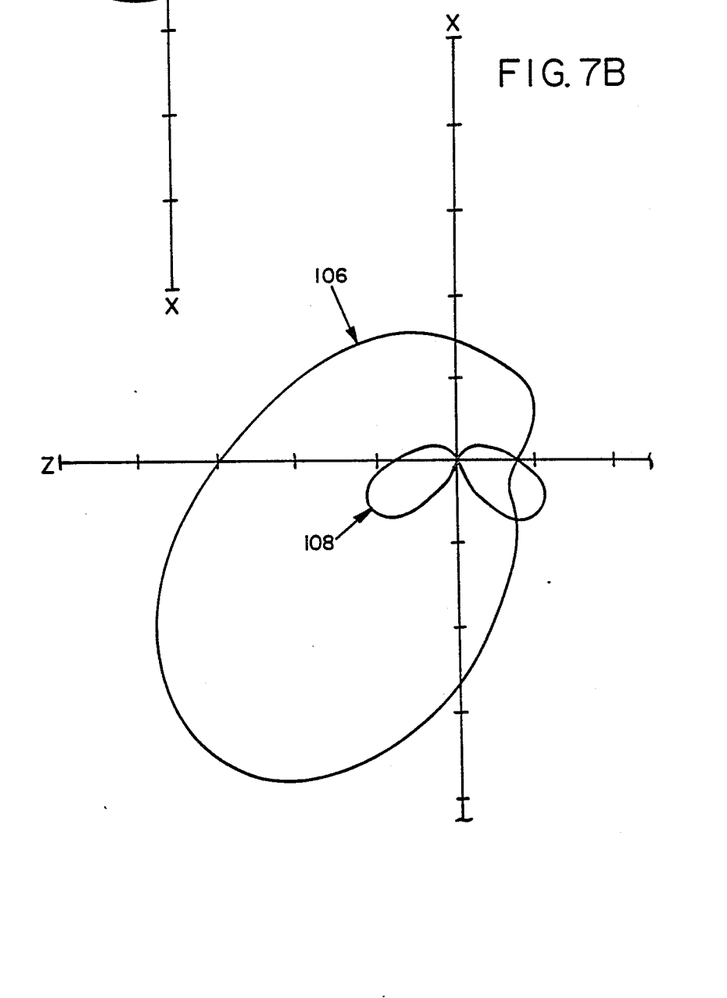

FIGS. 7A and 7B show the comparative relationship between light intensity computed in the opaque state and the transmitting state for a liquid crystal cell having the director alignment configuration of liquid crystal cell 10 with curved smectic layers and planar smectic layers tilted at 30° to the surface normal. With respect to FIG. 7A, light intensity patterns 102 and 104 represent the intensity of light transmitted in, respectively, the transmitting state and the opaque state. Comparison of FIG. 7A with FIG. 6A reveals that the light intensity patterns 94 and 102 are generally the same for the light transmitting state and that light intensity patterns 96 and 104 are generally the same for the opaque state. With respect to FIG. 7B, light intensity patterns 106 and 108 represent the intensity of light transmitted in, respectively, the transmitting state and the opaque state. Comparison of FIG. 7B with FIG. 6B reveals that the light intensity patterns 98 and 106 are generally the same for the light transmitting state and that light intensity patterns 100 and 108 are generally the same for the opaque state. One would conclude, therefore, that the advantage of cells with the surface contacting director alignment of liquid crystal cell 10 may be attributed to the curvature of the smectic layers.

The bistability of smectic C liquid crystal cell 10 provides light gate 40 with a light/dark image contrast ratio of about 20:1, as compared to other smectic C display devices which have contrast ratios no greater than 4:1, which is insufficient contrast for most display applications. Moreover, the ability to switch liquid crystal cell 10 between optical states at 100 microsecond intervals facilitates the fabrication of a high contrast, high resolution liquid crystal display device having, for example, 1000 line resolution capability.

It will be obvious to those having skill in the art that many changes may be made in the above-described details of the preferred embodiment of the present invention without departing from the underlying principles thereof. For example, the chiral smectic C phase could be replaced by a chiral smectic I phase or any other chiral smectic phase. As a second example, the liquid crystal cell 10 can be switched among director configurations other than the two uniform director orientations described in the preferred embodiment, thereby to provide a multi-state device. Such a multi-state device would include director alignment twist configurations that provide light transmission states of different light intensities. The scope of the present invention should be determined, therefore, only by the following claims.

What is claimed:

1. A method for fabricating a chiral smectic liquid crystal cell, the steps comprising:

applying an electrically conductive layer to a surface of each of two dielectric members to form a pair of electrode structures, at least one of the dielectric members being optically transparent;

conditioning the conductive layer on each of the pair of electrode structures so that in the chiral nematic phase the directors of liquid crystal material coming in contact therewith align in a predetermined direction;

positioning the pair of electrode structures so that the conductive layers thereof are in spaced-apart and face-to-face relation and so that in the chiral nematic phase the directors of liquid crystal material in contact with the conditioned layers align substantially uniformly to form tilt bias angles relative to the layers, the tilt bias angles of the directors in contact with the conditioned layer of one electrode structure being defined in a rotational sense opposite that of the tilt bias angles of the directors in contact with the conditioned layer of the other electrode structure;

introducing between the electrode structures a chiral liquid crystal material of a type which exhibits chiral nematic, smectic A, and chiral smectic phases at successively lower temperatures; and controlling the temperature of the liquid crystal material so that it enters in consecutive order the chiral nematic, the smectic A, and the chiral smectic phases, thereby to form a chiral smectic liquid crystal cell in which the liquid crystal material in the chiral smectic phase has molecules arranged in smectic layers of similar shape and intersecting the conditioned layers of the electrode structures at angles whose values correspond to those of the tilt bias angles.

2. The method of claim 1 in which the conductive layers on the electrode structures are conditioned by depositing silicon monoxide on the conductive layers.

3. The method of claim 1 in which the chiral smectic phase is of the smectic C type.

4. The method of claim 1 in which the conditioned layers of the pair of electrode structures are conditioned so that the tilt bias angles have absolute values of between about 5° and 45° relative to the conditioned layers.

5. A chiral smectic liquid crystal cell, comprising:
a liquid crystal material in the chiral smectic phase captured between the inner surfaces of first and second spaced-apart, opposed electrode structures, the liquid crystal material being of a type which exhibits in consecutive order chiral nematic, smectic A, and chiral smectic phases at successively lower temperatures and the inner surface of each electrode structure including a director alignment layer which has been conditioned so that in the chiral nematic phase the directors of the liquid crystal material in contact therewith form tilt bias angles relative to the director alignment layer, the tilt bias angles formed by directors in contact with the director alignment layer of the first electrode structure being defined in a rotational sense opposite that of the tilt bias angles formed by directors in contact with the director alignment layer of the second electrode structure,
whereby the liquid crystal material in the chiral smectic phase has molecules arranged in smectic layers of similar shape and intersecting the conditioned layers of the electrode structures at angles whose values correspond to those of the tilt bias angles.

6. The liquid crystal cell of claim 5 in which the director alignment layer comprises silicon monoxide.

7. The liquid crystal cell of claim 5 in which the chiral smectic phase is of the smectic C type.

8. The liquid crystal cell of claim 5 in which the director alignment layers are conditioned so that the tilt bias angles have absolute values of between about 5° and 45°.

9. A chiral smectic liquid crystal display device, comprising:
a pair of light polarizing filters having orthogonally related polarization states;
a chiral smectic liquid crystal cell positioned between the light polarization filters, the liquid crystal cell having first and second spaced-apart, opposed electrode structures that capture there between a chiral liquid crystal material of a type which exhibits in consecutive order chiral nematic, smectic A, and chiral smectic phases at successively lower temperatures, each of the electrode structures having an inner surface with a director alignment layer which has been conditioned so that in the chiral nematic phase the directors of the liquid crystal material in contact therewith form tilt bias angles relative to the director alignment layer, the tilt bias angles formed by directors in contact with the director alignment layer of the first electrode structure being defined in a rotational sense opposite that of the tilt bias angles formed by directors in contact with the director alignment layer of the second electrode structure, whereby the liquid crystal material in the chiral smectic phase has molecules arranged in smectic layers of similar shape and intersecting the conditioned layers of the electrode structures at angles whose values correspond to those of the tilt bias angles; and
means for selectively introducing within the cell first and second electric fields that develop respective first and second optical states, the first optical state positioning the directors in a first orientation to promote light transmission through the display device and the second optical state positioning the directors in a second orientation to prevent light transmission through the display device.

10. The display device of claim 9 in which the light polarizing filters comprise neutral density linear polarizing filters.

11. The display device of claim 9 in which the two optical states of the liquid crystal cell provide optical retardation of the same amount.

12. The display device of claim 11 in which the opposed electrode structures are separated by a distance that develops substantially half-wave retardation of light of a predetermined wavelength.

13. The display device of claim 11 in which the opposed electrode structures are separated by a distance that defines the thickness of the liquid crystal cell, the thickness being sufficiently small so that the directors therein do not assume a twist configuration in the direction of the cell thickness.

14. The display device of claim 9 in which the chiral smectic phase is of the smectic C type.

15. The method of claim 1 in which the chiral liquid crystal material is introduced at a temperature corresponding to the isotropic phase of the liquid crystal material.

16. The display device of claim 5 in which the opposed electrode structures are separated by a distance that defines the thickness of the liquid crystal cell, the thickness being sufficiently small so that the directors therein do not assume a twist configuration in the direction of the cell thickness.

17. A substantially defect-free chiral smectic liquid crystal cell, comprising:
first and second generally parallel electrode structures ;having opposed inner surfaces spaced apart by a predetermined distance; and
a liquid crystal material in the chiral smectic phase having molecules captures between the inner surfaces of the electrode structures, the molecules being arranged substantially uniformly in multiple nonplanar smectic layers of similar shape, each of the smectic layers having side boundaries intersecting different ones of the inner surfaces of the electrode structures.

18. The cell of claim 17 in which the side boundaries of each of the smectic layers intersect the inner surfaces of the electrode structures at angles of essentially equal absolute values.

19. The cell of claim 17 in which the side boundaries of each of the smectic layers intersect the inner surfaces of the electrode structures at angles, the angles formed at the intersections on the inner surface of the first electrode structure being of opposite rotational sense to that of the angles formed at the intersections on the inner surface of the second electrode structure.

20. The cell of claim 17 in which the smectic layers have changes in inclination located generally halfway between the inner surfaces of the electrode structures.

21. The cell of claim 17 in which the opposed electrode structures are separated by a distance that defines the thickness of the liquid crystal cell, the thickness being sufficiently small so that the molecules therein do not assume a twist configuration in the direction of the cell thickness.

22. The cell of claim 17 in which the chiral smectic phase is of the smectic C type.

23. A substantially defect-free chiral smectic liquid crystal cell, comprising:
first and second generally parallel electrode structures having opposed inner surfaces spaced apart by a predetermined distance; and
a liquid crystal material in the chiral smectic phase having molecules captured between the inner surfaces of the electrode structures, the molecules being arranged substantially uniformly in multiple smectic layers of similar shape, each of the smectic layers having side boundaries intersecting the inner surfaces of the electrode structures at angles, the angle formed at the intersection on the inner surface of the first electrode structure being of opposite rotational sense to that of the angle formed at the intersection on the inner surface of the second electrode structure.

24. The cell of claim 23 in which the angles are of essentially equal absolute values.

25. The cell of claim 24 in which the angles are greater than or equal to 5°.

26. The cell of claim 23 in which the opposed electrode structures are separated by a distance that defines the thickness of the liquid crystal cell, the thickness being sufficiently small so that the molecules therein do not assume a twist configuration in the direction of the cell thickness.

27. The cell of claim 23 in which the chiral smectic phase is of the smectic C type.

* * * * *